(12) United States Patent
Cho et al.

(10) Patent No.: US 12,330,477 B2
(45) Date of Patent: Jun. 17, 2025

(54) SLIM-TYPE HEAT MANAGEMENT SYSTEM FOR ELECTRIC VEHICLE

(71) Applicants: Hyundai Motor Company, Seoul (KR); Kia Corporation, Seoul (KR)

(72) Inventors: Wan Je Cho, Hwaseong-si (KR); Ji Wan Son, Yongin-si (KR); Sueng Ho Lee, Seoul (KR); Eon Soo Yun, Hwaseong-si (KR); Seong Bin Jeong, Hwaseong-si (KR); Myung Hwan Kim, Suwon-si (KR); Tae Hee Kim, Ansan-si (KR); Jae Eun Jeong, Hwaseong-si (KR); Seong Jae Lee, Suncheon-si (KR); Hyun Jae Lee, Seongnam-si (KR); Jun Young Kang, Goyang-si (KR); Dong Hyun Kong, Hwaseong-si (KR); Kyu Ho Chae, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 308 days.

(21) Appl. No.: 18/053,791

(22) Filed: Nov. 9, 2022

(65) Prior Publication Data
US 2023/0311617 A1   Oct. 5, 2023

(30) Foreign Application Priority Data
Mar. 29, 2022   (KR) .................. 10-2022-0038508

(51) Int. Cl.
B60H 1/00   (2006.01)
F16K 47/04   (2006.01)
(Continued)

(52) U.S. Cl.
CPC ..... *B60H 1/00921* (2013.01); *B60H 1/00392* (2013.01); *B60H 1/00485* (2013.01);
(Continued)

(58) Field of Classification Search
CPC ........ F25B 41/30; F25B 41/35; F25B 41/385; F25B 41/39; F25B 2313/02732;
(Continued)

(56) References Cited

U.S. PATENT DOCUMENTS

2013/0146251 A1* 6/2013 Benouali ............... F25B 29/003
   165/63
2014/0305154 A1* 10/2014 Yoshioka ............. F16K 11/087
   137/625

(Continued)

FOREIGN PATENT DOCUMENTS

KR   101817729 B1   1/2018

*Primary Examiner* — Jerry-Daryl Fletcher
*Assistant Examiner* — Daniel C Comings
(74) *Attorney, Agent, or Firm* — MCDONNELL BOEHNEN HULBERT & BERGHOFF LLP

(57) ABSTRACT

A slim-type heat management system for an electric vehicle is provided. The system includes various heat management modes using a number of parts including at least two three-way expansion valves. The various heat management modes include a heat pump dehumidification mode and a dehumidification max mode, which are for defogging, in addition to an indoor cooling mode, a battery cooling mode, and a heat pump mode for heating.

18 Claims, 7 Drawing Sheets

(51) Int. Cl.
*F25B 41/31* (2021.01)
*F16K 5/04* (2006.01)

(52) U.S. Cl.
CPC .... *F25B 41/31* (2021.01); *B60H 2001/00307* (2013.01); *F16K 5/0407* (2013.01); *F16K 47/045* (2013.01); *F25B 2313/02732* (2013.01)

(58) Field of Classification Search
CPC .... F16K 5/0407; F16K 5/0414; F16K 5/0605; F16K 5/061; F16K 47/045; B60H 1/00271; B60H 1/00392; B60H 1/00485; B60H 1/00914; B60H 1/00921; B60H 2001/3285
See application file for complete search history.

(56) References Cited

U.S. PATENT DOCUMENTS

2018/0209548 A1\* 7/2018 Zens ............... F16K 5/0605
2019/0308489 A1\* 10/2019 Spies ............... F25B 41/35

\* cited by examiner

SLIM-TYPE HEAT MANAGEMENT SYSTEM FOR ELECTRIC VEHICLE

CROSS REFERENCE TO RELATED APPLICATIONS

The present application claims priority to Korean Patent Application No. 10-2022-0038508, filed Mar. 29, 2022, the entire contents of which is incorporated herein for all purposes by this reference.

TECHNICAL FIELD

The present disclosure relates to a slim-type heat management system for an electric vehicle and, more particularly, to a slim-type heat management system for an electric vehicle in which a refrigerant circuit suitable for a small electric vehicle is built, thereby enabling a heat pump dehumidification mode to be executed by the heat pump mode during heating.

BACKGROUND

Electric vehicles are equipped with a heat management system, including an air conditioning system for indoor heating and cooling, and a cooling system for cooling power electronic (PE) parts, batteries, and the like through waste heat recovery.

The conventional heat management system may be built with various types of cooling circuits to implement various operating modes, and each cooling circuit includes essential components such as an electric water pump for circulating coolant, a radiator for heat dissipation of the coolant, a chiller for cooling the coolant, a heater for heating the coolant, a plurality of valves for controlling flow directions of the coolant, coolant lines connecting such parts, and the like.

However, when the conventional heat management system is constructed as a heat pump system that is capable of implementing various heat management modes such as a heating mode by a heat pump, a heating dehumidification mode by a heat pump, a battery heating mode, a cooling mode for PE part and a battery, an indoor cooling mode, and the like, there is a problem that a large number of parts, including four or more refrigerant valves, expansion valves, cooling water valves, waste heat recovery chillers, air conditioner pipes, and the like are required. In addition, there are problems that cost increases, and complexity and disadvantages of package layout for a room in which the PE parts are mounted increased, due to an increase in the number of parts.

Accordingly, in consideration of the above problems, development of a low-cost heat pump system suitable for a small electric vehicle, and for an electric vehicle having a priority of profitability over performance is required.

The foregoing is intended merely to aid in the understanding of the background of the present disclosure and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a slim-type heat management system for an electric vehicle, wherein implementation of various heat management modes may be easily accomplished by using a minimum number of parts including two three-way expansion valves and the like, wherein the various heat management modes include a heat pump dehumidification mode, a dehumidification max mode, and the like, which are for defogging, in addition to an indoor cooling mode, a battery cooling mode, and a heat pump mode for heating. Accordingly, the system is capable of being usefully applied to an electric vehicle being small and an electric vehicle having priority of profitability over performance.

In order to achieve the above objective, there may be provided a slim-type heat management system for an electric vehicle, the system including: an inner condenser mounted inside an air conditioner casing and connected to a discharge portion of an electric compressor by a first refrigerant flow path; a first three-way expansion valve connected to the inner condenser by a second refrigerant flow path; an outer condenser connected to a 1-1 outlet of the first three-way expansion valve by a third refrigerant flow path; a second three-way expansion valve connected to the outer condenser by a fourth refrigerant flow path; an expansion valve connected to a fifth refrigerant flow path branched off from the fourth refrigerant flow path; an evaporator mounted inside the air conditioner casing and connected to the expansion valve by a sixth refrigerant flow path; a seventh refrigerant flow path connected between a 1-2 outlet of the first three-way expansion valve and the sixth refrigerant flow path; an accumulator connected to the evaporator by a refrigerant return flow path and connected to a inlet portion of the electric compressor; an eighth refrigerant flow path connected between a 2-1 outlet of the second three-way expansion valve and the refrigerant return flow path; a battery chiller connected to a 2-2 outlet of the second three-way expansion valve by a ninth refrigerant flow path; and a tenth refrigerant flow path connected between the battery chiller and the refrigerant return flow path.

The outer condenser may be adopted to perform a condenser function in an air conditioning mode and to serve as an evaporator in a heat pump mode.

The first three-way expansion valve may include: a first valve body having a first inlet connected to the second refrigerant flow path, a 1-1 outlet connected to the third refrigerant flow path, and a 1-2 outlet connected to the seventh refrigerant flow path; and a first valve rotating member having a first main flow path provided in a form being bent at a right angle therein, a 1-1 expansion flow path provided at a partial circular arc section of an outer diameter surface for allowing communication to be accomplished between the first inlet and the 1-1 outlet, and a 1-2 expansion flow path provided at another circular arc section of an outer circumferential surface for allowing communication to be accomplished between the first inlet and the 1-2 outlet.

Here, the 1-1 expansion flow path may be provided to be concave at a circular arc section on one side, deviated out of the first main flow path, of an outer diameter surface of the first valve rotating member, and the 1-2 expansion flow path may be provided to be concave at a circular arc section on an opposite side, deviated out of the first main flow path, of the outer diameter surface of the first valve rotating member.

The second three-way expansion valve may include: a second valve body having a second inlet connected to the fourth refrigerant flow path, a 2-1 outlet connected to the eighth refrigerant flow path, and a 2-2 outlet connected to the ninth refrigerant flow path; and a second valve rotating member having a second main flow path provided in a form being bent at a right angle therein and a second expansion flow path provided at a partial circular arc section of an outer diameter surface for allowing communication to be accomplished between the second inlet and the 2-2 outlet.

Here, the second expansion flow path may be provided to be concave at a partial circular arc section on one side, deviated out of the second main flow path, of an outer diameter surface of the second valve rotating member.

An air conditioning mode for indoor cooling may be implemented in a state in which the first three-way expansion valve is controlled to be fully open so as to accomplish communication between the second refrigerant flow path and the third refrigerant flow path, the second three-way expansion valve is controlled to be closed so as to block refrigerant flow, and the expansion valve is controlled to be opened.

In the air conditioning mode, there may sequentially and repeatedly proceed processes such as a process in which a gaseous refrigerant with high temperature and high pressure having been discharged into the first refrigerant flow path by driving of the electric compressor is primarily subjected to heat dissipation in the inner condenser, a process in which the refrigerant flowing to the third refrigerant flow path by passing through the second refrigerant flow path and the first three-way expansion valve is converted into a liquid refrigerant with the high temperature and high pressure by secondary heat dissipation of the outer condenser, a process in which the refrigerant flowing along the fourth refrigerant flow path and the fifth refrigerant flow path is converted into the liquid refrigerant with low temperature and low pressure in the expansion valve, a process in which the refrigerant flowing along the sixth refrigerant flow path is converted into the gaseous refrigerant with the low temperature and low pressure in the evaporator, and a process in which the refrigerant that has passed through the evaporator returns to the accumulator and the electric compressor through the refrigerant return flow path.

A battery cooling mode may be implemented in a state in which the first three-way expansion valve is controlled to be fully open so as to accomplish communication between the second refrigerant flow path and the third refrigerant flow path, the second three-way expansion valve is controlled to be closed so as to block refrigerant flow between the fourth refrigerant flow path and the eighth refrigerant flow path and is controlled, at the same time, to allow the refrigerant to flow to be expandable from the fourth refrigerant flow path to the ninth refrigerant flow path, and the expansion valve is controlled to be closed.

In the battery cooling mode, there may sequentially and repeatedly proceed processes such as a process in which a gaseous refrigerant with the high temperature and high pressure having been discharged into the first refrigerant flow path by driving of the electric compressor is primarily subjected to heat dissipation in the inner condenser, a process in which the refrigerant flowing to the third refrigerant flow path by passing through the second refrigerant flow path and the first three-way expansion valve is converted into a liquid refrigerant with the high temperature and high pressure by secondary heat dissipation of the outer condenser, a process in which the refrigerant flowing along the fourth refrigerant flow path is expanded while passing through the second three-way expansion valve and is converted into the liquid refrigerant with the low temperature and low pressure, a process in which the refrigerant flowing along the ninth refrigerant flow path cools the battery while being converted into the gaseous refrigerant with the low temperature and low pressure in the battery chiller, and a process in which the refrigerant that has passed through the battery chiller returns to the accumulator and the electric compressor through the tenth refrigerant flow path and the refrigerant return flow path.

An air conditioning mode and a battery cooling mode may be simultaneously implemented in a state in which the first three-way expansion valve is controlled to be fully open so as to accomplish communication between the second refrigerant flow path and the third refrigerant flow path, the second three-way expansion valve is controlled so as to block the refrigerant flow between the fourth refrigerant flow path and the eighth refrigerant flow path and, at the same time, is controlled to allow the refrigerant to flow to be expandable from the fourth refrigerant flow path to the ninth refrigerant flow path, and the expansion valve is controlled to be opened.

In the air conditioning mode and the battery cooling mode, there may sequentially and repeatedly proceed processes such as a process in which a gaseous refrigerant with the high temperature and high pressure having been discharged into the first refrigerant flow path by driving of the electric compressor is primarily subjected to heat dissipation in the inner condenser, a process in which the refrigerant flowing to the third refrigerant flow path by passing through the second refrigerant flow path and the first three-way expansion valve is converted into a liquid refrigerant with the high temperature and high pressure by secondary heat dissipation of the outer condenser, a process in which the refrigerant flowing along the fourth refrigerant flow path is expanded while passing through the second three-way expansion valve and is converted into the liquid refrigerant with the low temperature and low pressure, a process in which the refrigerant flowing along the ninth refrigerant flow path cools the battery while being converted into the gaseous refrigerant with the low temperature and low pressure in the battery chiller, a process in which the refrigerant flowing along the fourth refrigerant flow path and the fifth refrigerant flow path is converted into the liquid refrigerant with the low temperature and low pressure in the expansion valve, a process in which the refrigerant flowing along the sixth refrigerant flow path is converted into the gaseous refrigerant with the low temperature and low pressure in the evaporator, and a process in which the refrigerant that has passed through the battery chiller returns to the accumulator and the electric compressor by passing through the tenth refrigerant flow path and the refrigerant return flow path, and at the same time, the refrigerant that has passed through the evaporator returns to the accumulator and the electric compressor by passing through the refrigerant return flow path.

A heat pump mode may be implemented in a state in which the first three-way expansion valve 100 is controlled so as to block refrigerant flow between the second refrigerant flow path and the seventh refrigerant flow path and is controlled, at the same time, is controlled to allow the refrigerant to flow to be expandable from the second refrigerant flow path to the third refrigerant flow path, the second three-way expansion valve 200 is controlled to be fully open so as to accomplish communication between the fourth refrigerant flow path and the eighth refrigerant flow path, and the expansion valve 60 is controlled to be closed.

In the heat pump mode, there may sequentially and repeatedly proceed processes such as a process in which, when a gaseous refrigerant with the high temperature and high pressure having been discharged into the first refrigerant flow path by driving of the electric compressor is subjected to heat dissipation while being converted into a liquid refrigerant with the high temperature and high pressure in the inner condenser, the external air passing through periphery of the inner condenser is heated and faces the inside of a room, a process in which the refrigerant flowing along the second refrigerant flow path from the inner condenser is converted into the liquid refrigerant with the low temperature and low pressure while passing through the first three-way expansion valve, thereby flowing into the third refrigerant flow path, a process in which the refrigerant flowing into the third refrigerant flow path is converted into the gaseous refrigerant with the low temperature and low pressure in the outer condenser, and a process in which the refrigerant that has passed through the outer condenser returns to the accumulator and the electric compressor by passing through the fourth refrigerant flow path, the second three-way expansion valve, the eighth refrigerant flow path, and the refrigerant return flow path in order.

A heat pump dehumidification mode for defogging may be implemented in a state in which the first three-way expansion valve is controlled to allow the refrigerant to flow from the second refrigerant flow path to the third refrigerant flow path and the seventh refrigerant flow path to flow to be expandable at the same time, the second three-way expansion valve is controlled to be fully open to accomplish communication of the fourth refrigerant flow path and the eighth refrigerant flow path, and the expansion valve is controlled to be closed.

In the heat pump dehumidification mode, there may sequentially and repeatedly proceed processes such as a process in which, when a gaseous refrigerant with the high temperature and high pressure having been discharged into the first refrigerant flow path by driving of the electric compressor is subjected to heat dissipation while being converted into a liquid refrigerant with the high temperature and high pressure in the inner condenser, the external air passing through periphery of the inner condenser is heated and faces the inside of a room, a process in which the refrigerant flowing along the second refrigerant flow path from the inner condenser is converted into the liquid refrigerant with the low temperature and low pressure while passing through the first three-way expansion valve, thereby flowing into the third refrigerant flow path and the seventh refrigerant flow path, a process in which the refrigerant flowing into the third refrigerant flow path is converted into the gaseous refrigerant with the low temperature and low pressure in the outer condenser, a process in which, when the refrigerant flowing into the seventh refrigerant flow path is converted into the gaseous refrigerant with the low temperature and low pressure due to heat absorption of the evaporator, the external air passing through the evaporator is cooled and supplied for dehumidification to the inside of a room, and a process in which the refrigerant that has passed through the outer condenser returns to the accumulator and the electric compressor by passing through the fourth refrigerant flow path, the second three-way expansion valve, the eighth refrigerant flow path, and the refrigerant return flow path in order, and at the same time, the refrigerant that has passed through the evaporator returns to the accumulator and the electric compressor by passing through the refrigerant return flow path in order.

A dehumidification max mode for strengthening defogging may be implemented in a state in which the first three-way expansion valve is controlled so as to block the refrigerant flow between the second refrigerant flow path and the third refrigerant flow path and is controlled, at the same time, to allow the refrigerant to flow to be expandable from the second refrigerant flow path to the seventh refrigerant flow path, and the expansion valve is controlled to be closed.

In the dehumidification max mode, there may sequentially and repeatedly proceed processes such as a process in which a gaseous refrigerant with the high temperature and high pressure having been discharged into the first refrigerant flow path by driving of the electric compressor is converted into a liquid refrigerant with the high temperature and high pressure in the inner condenser, a process in which the refrigerant flowing along the second refrigerant flow path from the inner condenser is converted into the liquid refrigerant with the low temperature and low pressure while passing through the first three-way expansion valve, thereby intensively flowing only into the seventh refrigerant flow path, a process in which, when the refrigerant flowing into the seventh refrigerant line is converted into a low-temperature and low-pressure gaseous refrigerant by heat absorption of the evaporator, the external air passing through periphery of the evaporator is cooled and supplied for dehumidification to the inside of a room, and a process in which, the refrigerant that has passed through the evaporator returns to the accumulator and the electric compressor by passing through the refrigerant return flow path in order.

As described above, the present disclosure the present disclosure provides the following effects.

First, by using a minimum number of parts including two three-way expansion valves and the like, implementation of various heat management modes including a heat pump dehumidification mode, a dehumidification max mode, and the like, which are for defogging, in addition to an indoor cooling mode, a battery cooling mode, and a heat pump mode for heating may be easily accomplished.

Second, various heat management modes can be implemented even using the minimum number of parts including two three-way expansion valves and the like, so it is possible to provide a slim heat management system suitable for an electric vehicle that is small and for an electric vehicle that has a priority of profitability over performance.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Exemplary embodiments of the present disclosure will be described in detail with reference to the accompanying drawings.

In an electric vehicle that is small and an electric vehicle that has a priority of profitability over performance, PE parts, which include a motor and an inverter, and a battery, which is capable of being charged and discharged for supplying power to the PE parts, are mounted, and the battery is to be maintained at an optimum temperature suitable for maintaining performance thereof through cooling and the like. Meanwhile, the electric vehicle does not have an internal combustion engine, so a separate heat pump system for heating and cooling should be mounted.

Accordingly, in the electric vehicle that is small and the electric vehicle that has the priority of profitability over performance, even when the minimum number of parts is used, a heat management system may be mounted so that implementation of various heat management modes is easily made, wherein various heat management modes include a heat pump dehumidification mode, a dehumidification max mode, and the like, which are for defogging, in addition to an indoor cooling mode, a battery cooling mode, and a heat pump mode for heating.

Figure 1:
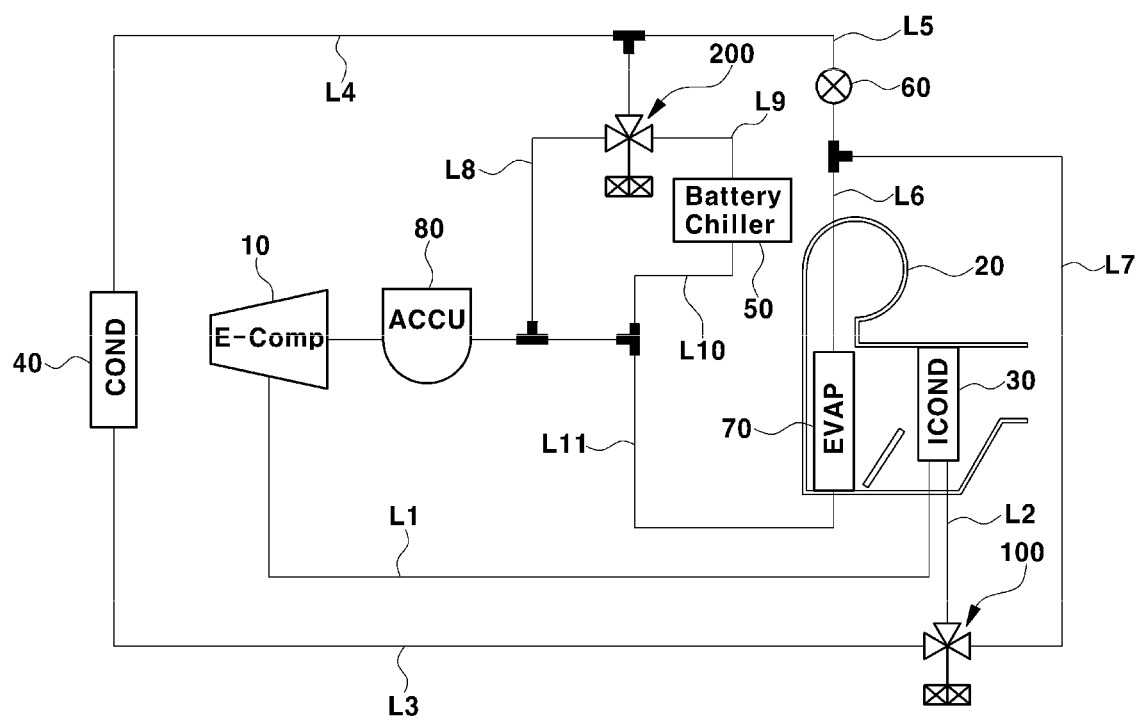
FIG. 1 is a refrigerant circuit diagram showing a slim-type heat management system for an electric vehicle according to the present disclosure.

Accompanying FIG. 1 is a refrigerant circuit diagram showing a slim-type heat management system for an electric vehicle according to the present disclosure, and reference numeral 10 denotes an electric compressor.

The electric compressor 10 is driven to make refrigerant into a gaseous state with high temperature and high pressure.

A refrigerant discharge portion of the electric compressor 10 is connected to an inner condenser mounted inside an air conditioner casing 20 by a first refrigerant flow path L1.

For reference, the air conditioner casing 20 refers to a structure manufactured to have an air flow path that allows external air to flow toward the interior and mounted in an electric vehicle.

The inner condenser 30 is adopted to perform a condensation function of converting a gaseous refrigerant with high temperature and high pressure into a liquid refrigerant with the high temperature and high pressure in the heat pump mode.

Accordingly, the gaseous refrigerant with the high temperature and high pressure having been discharged into the first refrigerant flow path L1 by driving of the electric compressor 10 may be condensed and converted into the liquid refrigerant with the high temperature and high pressure while being subjected to heat dissipation in the inner condenser 30.

An outlet of the inner condenser 30 is connected to a first three-way expansion valve 100 by a second refrigerant flow path L2.

Here, the first three-way expansion valve 100 may include a first valve body 110 and a first valve rotating member 120.

The first valve body 110 of the first three-way expansion valve 100 includes: a first inlet 111 connected to the second refrigerant flow path L2; a 1-1 outlet 112 connected to a third refrigerant flow path L3; and a 1-2 outlet 113 connected to a seventh refrigerant flow path L7.

Accordingly, the second refrigerant flow path L2 extending from the inner condenser 30 is connected to the first inlet 111 of the first valve body 110 of the first three-way expansion valve 100, one end portion of the third refrigerant flow path L3 is connected to the 1-1 outlet 112, and one end portion of the seventh refrigerant flow path L7 is connected to the 1-2 outlet 113.

The first valve rotating member 120 of the first three-way expansion valve 100 includes: a first main flow path 123 provided in a form being bent at a right angle therein; a 1-1 expansion flow path 121 provided for communicating between the first inlet 111 and the 1-1 outlet 112 at a partial circular arc section of an outer diameter surface; and a 1-2 expansion flow path 122 provided for communicating between the first inlet 111 and the 1-2 outlet 113 at another circular arc section of the outer circumferential surface.

In other words, the 1-1 expansion flow path 121 of the first valve rotating member 120 may be provided to be concave at a circular arc section on one side, which is deviated out of the first main flow path 123, of an outer diameter surface of the first valve rotating member 120, and the 1-2 expansion flow path 122 may be provided to be concave at a circular arc section on an opposite side, which is deviated out of the first main flow path 123, of the outer diameter surface of the first valve rotating member 120.

For reference, the first valve rotating member 120 may be rotated by an actuator driven by a control signal of a controller (not shown).

The 1-1 outlet 112 of the first three-way expansion valve 100 is connected to an outer condenser by a third refrigerant flow path L3.

That is, one end portion of the third refrigerant flow path L3 is connected to the 1-1 outlet 112 of the first valve body 110 of the first three-way expansion valve 100, and an opposite end portion of the third refrigerant flow path L3 is connected to an inlet portion of the outer condenser 40.

The outer condenser 40 is adopted to perform a condenser function in an air conditioning mode for indoor cooling and to serve as an evaporator in a heat pump mode for indoor heating, as will be described later.

At this time, an outlet portion of the outer condenser 40 is connected to the second three-way expansion valve 200 by a fourth refrigerant flow path L4.

Here, the second three-way expansion valve 200 may include a second valve body 210 and a second valve rotating member 220.

The second valve body 210 of the second three-way expansion valve 200 includes: a second inlet 211 connected to the fourth refrigerant flow path L4; a 2-1 outlet 212 connected to an eighth refrigerant flow path L8; and a 2-2 outlet 213 connected to a ninth refrigerant flow path L9.

Accordingly, a fourth refrigerant flow path L4 extending from the outer condenser 40 is connected to the second inlet 211 of the second valve body 210 of the second three-way expansion valve 200, one end portion of the eighth refrigerant flow path L8 is connected to the 2-1 outlet 212, and one end portion of the ninth refrigerant flow path L9 is connected to the 2-2 outlet 213.

The second valve rotating member 220 of the second three-way expansion valve 200 includes: a second main flow path 221 provided in a form being bent at a right angle therein; and a second expansion flow path 222 provided at a partial circular arc section of an outer diameter surface for allowing communication to be accomplished between the second inlet 211 and the 2-2 outlet 213.

Here, the second expansion flow path 222 may be provided to be concave at the partial circular arc section deviated out of the second main flow path 221 on the outer diameter surface of the second valve rotating member 220.

In other words, the second expansion flow path of the second valve rotating member 220 may be provided to be concave at a circular arc section on one side, deviated out of the second main flow path, of an outer diameter surface of the second valve rotating member.

For reference, the second valve rotating member 220 may be rotated by an actuator driven by a control signal of the controller (not shown).

The 2-1 outlet 212 of the second valve rotating member 220 of the second three-way expansion valve 200 is connected to a refrigerant return flow path L11 by the eighth refrigerant flow path L8.

In addition, the 2-2 outlet 213 of the second valve rotating member 220 of the second three-way expansion valve 200 is connected to an inlet portion of the battery chiller 50 by the ninth refrigerant flow path L9, and an outlet portion of the battery chiller 50 is connected to the refrigerant return flow path L11 by a tenth refrigerant flow path L10.

At this time, an inlet portion of an expansion valve 60 is connected to a fifth refrigerant flow path L5 branched off from the fourth refrigerant flow path L4, and a sixth refrigerant flow path L6 is connected to an outlet portion of the expansion valve 60.

Here, the expansion valve 60 may be a solenoid type valve that opens and closes a refrigerant expansion path according to a signal from the controller (not shown) and may block refrigerant flow between the fifth refrigerant flow path L5 and the sixth refrigerant flow path L6. Alternatively, the expansion valve 60 may perform a function to allow the flow of the refrigerant flowing from the fifth refrigerant flow path L5 to the sixth refrigerant flow path L6 to be expandable.

The outlet portion of the expansion valve 60 is connected to an evaporator 70 mounted inside the air conditioner casing 20 by the sixth refrigerant flow path L6, and an outlet portion of the evaporator 70 is connected to the refrigerant return flow path L11.

At this time, an accumulator 80, which separates and stores the refrigerant in the gaseous phase and the refrigerant in the liquid phase, is connected to the refrigerant return flow path L11, to which the outlet portion of the evaporator 70, the eighth refrigerant flow path L8, and the tenth refrigerant flow path L10 are connected. In addition, an outlet portion of the accumulator 80 is connected to a inlet portion of the electric compressor 10.

On the other hand, the 1-2 outlet 113 of the first valve body 110 of the first three-way expansion valve 100 is connected to the sixth refrigerant flow path L6 by the seventh refrigerant flow path L7.

Here, each operation mode of the slim-type heat management system of the present disclosure configured as described above is as follows.

Air Conditioning Mode

Figure 2:
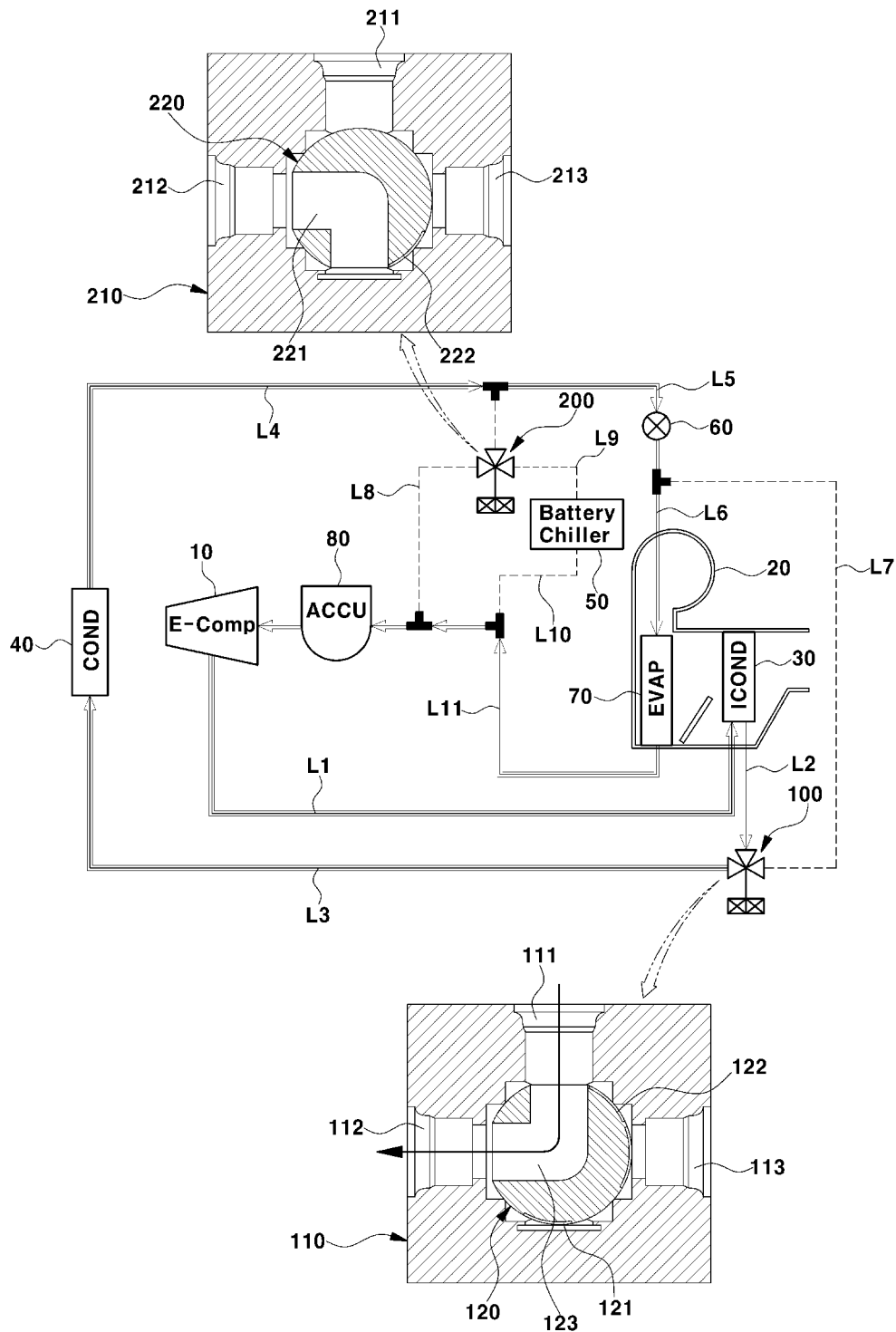
FIG. 2 is a refrigerant circuit diagram showing an air conditioning mode of the slim-type heat management system for an electric vehicle according to the present disclosure.

Accompanying FIG. 2 is a refrigerant circuit diagram showing an air conditioning mode of the slim-type heat management system for an electric vehicle according to the present disclosure.

The air conditioning mode is a mode for indoor cooling and may be implemented in a state in which the first three-way expansion valve 100 is controlled to be fully open so as to accomplish communication between the second refrigerant flow path L2 and the third refrigerant flow path L3, the second three-way expansion valve 200 is controlled to be closed so as to block the refrigerant flow, and the expansion valve 60 is controlled to be opened.

In more detail, as shown in FIG. 2, for the air conditioning mode for indoor cooling, the first valve rotating member 120 of the first three-way expansion valve 100 is controlled to be in a fully open state to accomplish communication between the first inlet 111 connected to the second refrigerant flow path L2 and the 1-1 outlet 112 connected to the third refrigerant flow path L3 by the first main flow path 123, the second valve rotating member 220 of the second three-way expansion valve 200 is controlled to be closed not to allow the refrigerant to flow from the second inlet 211 connected to the fourth refrigerant flow path L4 to the 2-1 outlet 212 connected to the eighth refrigerant flow path L8 and the 2-2 outlet 213 connected to the ninth refrigerant flow path L9, and the expansion valve 60 is controlled to be opened to allow the refrigerant to flow from the fifth refrigerant flow path L5 to the sixth refrigerant flow path L6 in an expandable manner.

Subsequently, there proceeds a process in which the gaseous refrigerant with the high temperature and high pressure having been discharged into the first refrigerant flow path L1 by the driving of the electric compressor 10 flows into the inner condenser 30.

Accordingly, after the refrigerant that has entered the inner condenser 30 is primarily subjected to heat dissipation by the condensation action of the inner condenser 30, there proceeds a process of flowing to the outer condenser 40 along the third refrigerant flow path L3 after passing through the second refrigerant flow path L2 and through the first main flow path 123 of the first three-way expansion valve 100.

Subsequently, there proceeds a process in which the refrigerant entering the outer condenser 40 is converted into the liquid refrigerant with the high temperature and high pressure while being subjected to secondary heat dissipation by the condensation action of the outer condenser 40.

Next, there proceeds a process in which the refrigerant flowing along the fourth refrigerant flow path L4 and the fifth refrigerant flow path L5 from the outer condenser 40 is converted into the liquid refrigerant with low temperature and low pressure in the expansion valve 60.

Subsequently, when there proceeds a process in which the refrigerant flowing along the sixth refrigerant flow path L6 enters the evaporator 70 and is converted into the gaseous refrigerant with the low temperature and low pressure, the external air passing through the periphery of the evaporator 70 is cooled through heat exchange and faces the inside of the room, whereby indoor cooling may be accomplished.

Thereafter, there proceeds a process in which the refrigerant that has passed through the evaporator 70 returns to the accumulator 80 and the electric compressor 10 through the refrigerant return flow path L11.

As above, the processes for the air conditioning mode proceed sequentially and repeatedly, whereby the indoor cooling may be easily accomplished.

Battery Cooling Mode

Figure 3:
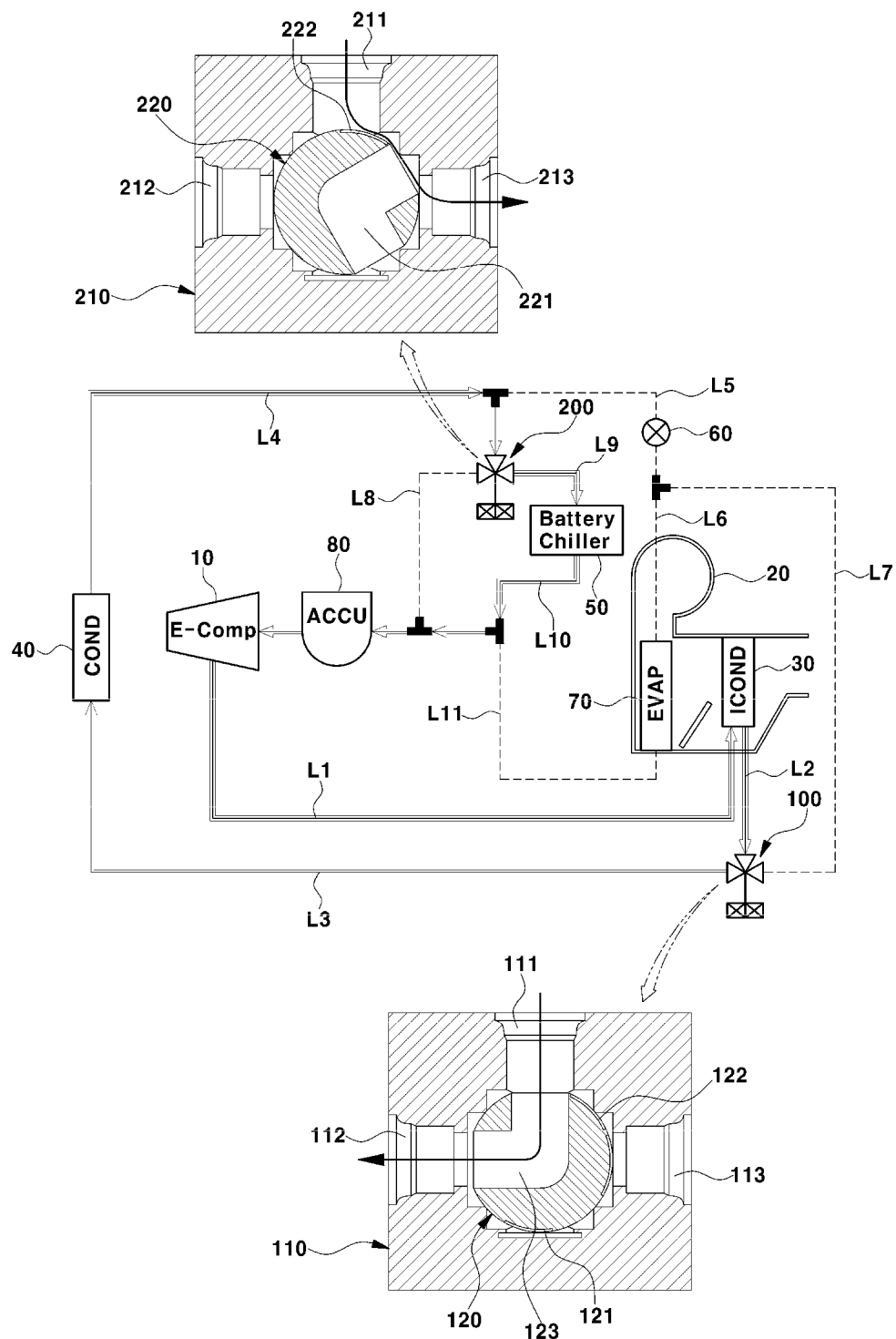
FIG. 3 is a refrigerant circuit diagram showing a battery cooling mode of the slim-type heat management system for an electric vehicle according to the present disclosure.

Accompanying FIG. 3 is a refrigerant circuit diagram showing a battery cooling mode of the slim-type heat management system for an electric vehicle according to the present disclosure.

The battery cooling mode is a mode for cooling the battery mounted in the electric vehicle to an appropriate temperature and may be implemented in a state in which the first three-way expansion valve 100 is controlled to be fully open to accomplish communication between the second refrigerant flow path L2 and the third refrigerant flow path L3, the second three-way expansion valve 200 is controlled to block the refrigerant flow between the fourth refrigerant flow path L4 and the eighth refrigerant flow path L8 and, at the same time, is controlled to allow the refrigerant to flow to be expandable from the fourth refrigerant flow path L4 to the ninth refrigerant flow path L9, and the expansion valve 60 is controlled to be closed.

In more detail, as shown in FIG. 3, for the battery cooling mode, the first valve rotating member 120 of the first three-way expansion valve 100 is controlled to be in a fully open state to accomplish communication between the first inlet 111 connected to the second refrigerant flow path L2 and the 1-1 outlet 112 connected to the third refrigerant flow path L3 by the first main flow path 123, the second valve rotating member 220 of the second three-way expansion valve 200 is controlled not to allow the refrigerant to flow from the second inlet 211 connected to the fourth refrigerant flow path L4 to the 2-1 outlet 212 connected to the eighth refrigerant flow path L8 and is controlled, at the same time, to allow the refrigerant to flow to be expandable from the second inlet 211 connected to the fourth refrigerant flow path L4 to the second outlet 213 connected to the ninth refrigerant flow path L9 passing through the second expansion flow path 222, and the expansion valve 60 is controlled to be closed not to allow the refrigerant to flow from the fifth refrigerant flow path L5 to the sixth refrigerant flow path L6.

Subsequently, there proceeds a process in which the gaseous refrigerant with the high temperature and high pressure having been discharged into the first refrigerant flow path L1 by the driving of the electric compressor 10 flows into the inner condenser 30.

Accordingly, after the refrigerant that has entered the inner condenser 30 is primarily subjected to heat dissipation by the condensation action of the inner condenser 30, there proceeds a process of flowing to the outer condenser 40 along the third refrigerant flow path L3 after passing through the second refrigerant flow path L2 and through the first main flow path 123 of the first three-way expansion valve 100.

Subsequently, there proceeds a process in which the refrigerant entering the outer condenser 40 is converted into the liquid refrigerant with the high temperature and high pressure while being subjected to secondary heat dissipation by the condensation action of the outer condenser 40.

Next, there proceeds a process in which the refrigerant flowing along the fourth refrigerant flow path L4 from the outer condenser 40 is expanded while passing through the second three-way expansion valve 200 and is converted into the liquid refrigerant with the low temperature and low pressure.

In other words, there may proceed a process in which, the refrigerant flowing along the fourth refrigerant flow path L4 from the outer condenser 40, after entering the second inlet 211 of the second three-way expansion valve 200, passes from the second inlet 211 through the second expansion flow path 222, which is narrow like an orifice path of the second valve rotating member 220, and expands while flowing to the 2-2 outlet 213, thereby being converted into the liquid refrigerant with the low temperature and low pressure.

Subsequently, there proceeds a process in which, the refrigerant exiting the 2-2 outlet 213 of the second three-way expansion valve 200, that is, the liquid refrigerant with the low temperature and low pressure enters the battery chiller 50 along the ninth refrigerant flow path L9 and cools the battery (not shown) while being converted into the gaseous refrigerant with the low temperature and low pressure.

In other words, the liquid refrigerant with the low temperature and low pressure entered the battery chiller 50 may absorb heat from the battery for cooling the battery, thereby being converted into the gaseous refrigerant with the low temperature and low pressure.

Thereafter, there proceeds a process in which the refrigerant that has passed through the battery chiller 50 returns to the accumulator 80 and the electric compressor 10 through the refrigerant return flow path L11.

As above, the processes for the battery cooling mode proceed sequentially and repeatedly, whereby the battery may be controlled to be easily cooled to an appropriate temperature.

Air Conditioning Mode and Battery Cooling Mode

Figure 4:
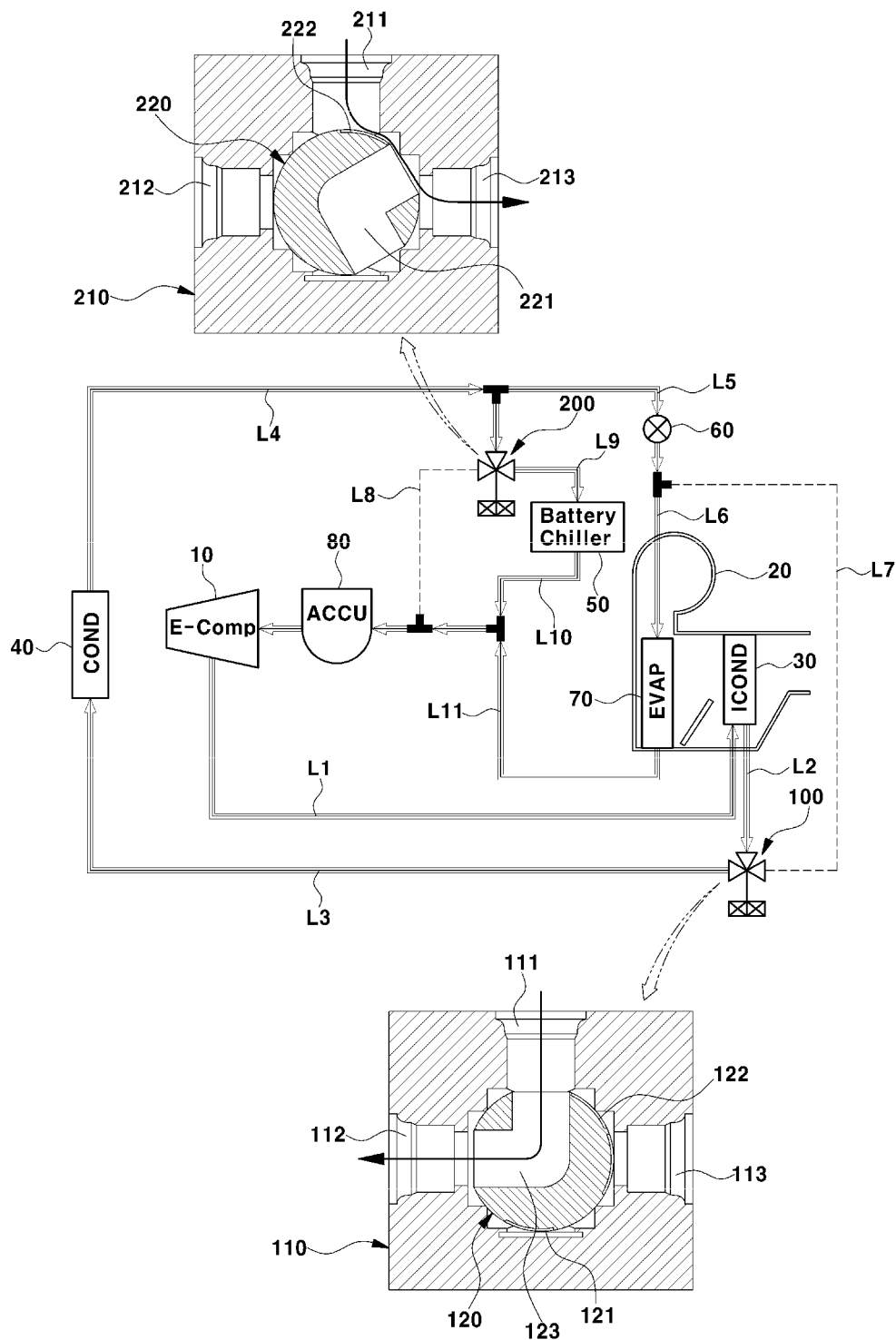
FIG. 4 is a refrigerant circuit diagram showing the air conditioning mode and the battery cooling mode of the slim-type heat management system for an electric vehicle according to the present disclosure.

Accompanying FIG. 4 is a refrigerant circuit diagram showing the air conditioning mode and the battery cooling mode of the slim-type heat management system for an electric vehicle according to the present disclosure.

The air conditioning mode and the battery cooling mode refer to a mode in which the room cooling and the battery cooling are accomplished simultaneously and may be implemented in a state in which the first three-way expansion valve 100 is controlled to be fully open to accomplish communication between the second refrigerant flow path L2 and the third refrigerant flow path L3, the second three-way expansion valve 200 is controlled to block the refrigerant flow between the fourth refrigerant flow path L4 and the eighth refrigerant flow path L8 and is controlled, at the same time, to allow the refrigerant to flow to be expandable from the fourth refrigerant flow path L4 to the ninth refrigerant flow path L9, and the expansion valve 60 is controlled to be opened.

In more detail, as shown in FIG. 4, for the air conditioning mode and the battery cooling mode, the first valve rotating member 120 of the first three-way expansion valve 100 is controlled to be in a fully open state to accomplish communication between the first inlet 111 connected to the second refrigerant flow path L2 and the 1-1 outlet 112 connected to the third refrigerant flow path L3 by the first main flow path 123, the second valve rotating member 220 of the second three-way expansion valve 200 is controlled not to allow the refrigerant to flow from the second inlet 211 connected to the fourth refrigerant flow path L4 to the 2-1 outlet 212 connected to the eighth refrigerant flow path L8 and is controlled, at the same time, to allow the refrigerant to flow from the second inlet 211 connected to the fourth refrigerant flow path L4 to the second outlet 213 connected to the ninth refrigerant flow path L9 via the second expansion flow path 222, and the expansion valve 60 is controlled to be opened to allow the refrigerant to flow from the fifth refrigerant flow path L5 to the sixth refrigerant flow path L6.

Subsequently, there proceeds a process in which the gaseous refrigerant with the high temperature and high pressure having been discharged into the first refrigerant flow path L1 by the driving of the electric compressor 10 flows into the inner condenser 30.

Accordingly, after the refrigerant that has entered the inner condenser 30 is primarily subjected to heat dissipation by the condensation action of the inner condenser 30, there proceeds a process of flowing to the outer condenser 40 along the third refrigerant flow path L3 after passing through the second refrigerant flow path L2 and through the first main flow path 123 of the first three-way expansion valve 100.

Subsequently, there proceeds a process in which the refrigerant entering the outer condenser 40 is converted into the liquid refrigerant with the high temperature and high pressure while being subjected to secondary heat dissipation by the condensation action of the outer condenser 40.

Next, there proceeds a process in which the refrigerant flowing along the fourth refrigerant flow path L4 and the fifth refrigerant flow path L5 from the outer condenser 40 is converted into the liquid refrigerant with the low temperature and low pressure in the expansion valve 60.

Subsequently, when there proceeds a process in which the refrigerant flowing along the sixth refrigerant flow path L6 enters the evaporator 70 and is converted into the gaseous refrigerant with the low temperature and low pressure, the external air passing through the periphery of the evaporator 70 is cooled through heat exchange and faces the inside of the room, whereby indoor cooling may be accomplished.

At this time, in the air conditioning mode as described above, there proceeds a process in which the refrigerant flowing along the fourth refrigerant flow path L4 from the outer condenser 40 is expanded while passing through the second three-way expansion valve 200 and is converted into the liquid refrigerant with the low temperature and low pressure.

In other words, there may proceed a process in which, the refrigerant flowing along the fourth refrigerant flow path L4 from the outer condenser 40, after entering the second inlet 211 of the second three-way expansion valve 200, passes from the second inlet 211 through the second expansion flow path 222, which is narrow like an orifice path of the second valve rotating member 220, and expands while flowing to the 2-2 outlet 213, thereby being converted into the liquid refrigerant with the low temperature and low pressure.

Subsequently, there proceeds a process in which, the refrigerant exiting the 2-2 outlet 213 of the second three-way expansion valve 200, that is, the liquid refrigerant with the low temperature and low pressure enters the battery chiller 50 along the ninth refrigerant flow path L9 and cools the battery (not shown) while being converted into the gaseous refrigerant with the low temperature and low pressure.

Thereafter, there proceeds a process in which the refrigerant that has passed through the battery chiller 50 returns to the accumulator 80 and the electric compressor 10 through the tenth refrigerant flow path L10 and the refrigerant return flow path L11, and at the same time, the refrigerant that has passed through the evaporator 70 returns also to the accumulator and the electric compressor through the refrigerant return flow path L11.

As above, the processes for the air conditioning mode and the battery cooling mode proceed sequentially and repeatedly, whereby indoor cooling and air conditioning cooling may be accomplished at the same time.

Heat Pump Mode

Figure 5:
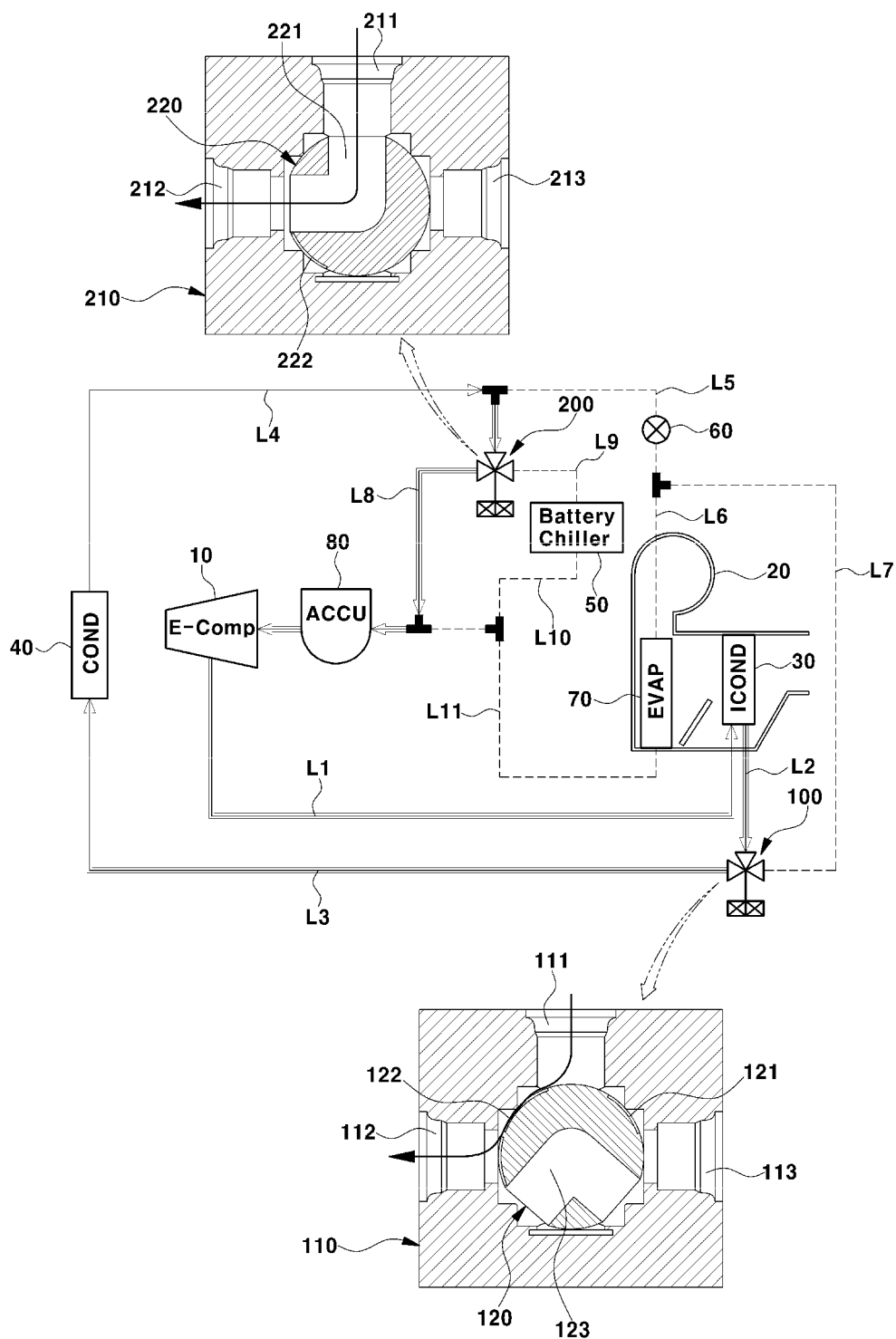
FIG. 5 is a refrigerant circuit diagram showing a heat pump mode of the slim-type heat management system for an electric vehicle according to the present disclosure.

Accompanying FIG. 5 is a refrigerant circuit diagram showing a heat pump mode of the slim-type heat management system for an electric vehicle according to the present disclosure.

The heat pump mode is a mode for indoor heating and may be implemented in a state in which the first three-way expansion valve 100 is controlled to block the refrigerant flow between the second refrigerant flow path L2 and the seventh refrigerant flow path L7 and is controlled, at the same time, to allow the refrigerant to flow to be expandable from the second refrigerant flow path L2 to the third refrigerant flow path L3, the second three-way expansion valve 200 is controlled to be fully open to accomplish communication between the fourth refrigerant flow path L4 and the eighth refrigerant flow path L8, and the expansion valve 60 is controlled to be closed.

In more detail, as shown in FIG. 5, for the heat pump mode, the first valve rotating member 120 of the first three-way expansion valve 100 is controlled not to allow the refrigerant to flow from the first inlet 111 connected to the second refrigerant flow path L2 to the 1-2 outlet 113 connected to the seventh refrigerant flow path L7, and is controlled, at the same time, to allow the refrigerant to flow from the first inlet 111 connected to the second refrigerant flow path L2 to the 1-1 outlet 112 connected to the third refrigerant flow path L3 passing through the 1-1 expansion flow path 121, the second valve rotating member 220 of the second three-way expansion valve 200 is controlled to be in a fully open state to accomplish communication between the second inlet 211 connected to the fourth refrigerant flow path L4 and the second outlet 213 connected to the eighth refrigerant flow path L8, and the expansion valve 60 is controlled to be opened to allow the refrigerant to flow from the fifth refrigerant flow path L5 to the sixth refrigerant flow path L6.

Subsequently, there proceeds a process in which the gaseous refrigerant with the high temperature and high pressure having been discharged into the first refrigerant flow path L1 by the driving of the electric compressor 10 flows into the inner condenser 30.

Accordingly, there proceeds a process in which the refrigerant entering the inner condenser 30 is converted into the liquid refrigerant with the high temperature and high pressure by the condensation action of the inner condenser 30, thereby being subjected to the heat dissipation.

At this time, when the refrigerant in the inner condenser 30 is converted into the liquid refrigerant with the high temperature and high pressure, thereby being subjected to the heat dissipation, the external air passing through the periphery of the inner condenser 30 is heated and faces the inside of the room, whereby indoor heating may be accomplished.

Subsequently, there proceeds a process in which the refrigerant flowing along the second refrigerant flow path L2 from the inner condenser 30 is converted into the liquid refrigerant with the low temperature and low pressure while passing through the first three-way expansion valve 100, thereby flowing into the third refrigerant flow path L3.

In other words, there may proceed a process in which, the refrigerant flowing along the second refrigerant flow path L2 from the inner condenser 30 in the liquid state having the low temperature and low pressure, after entering the first inlet 111 of the first three-way expansion valve 100, as shown in FIG. 5, passes from the first inlet 111 through the 1-1 expansion flow path 121, which is narrow like an orifice path of the first valve rotating member 120, and expands while flowing to the 1-1 outlet 112, thereby being converted into the liquid refrigerant with the low temperature and the low pressure.

Next, there proceeds a process in which the refrigerant flowing from the 1-1 outlet 112 to the third refrigerant flow path L3 is converted into the gaseous refrigerant with the low temperature and low pressure at the outer condenser 40.

At this time, the outer condenser 40 serves as an evaporator to convert the liquid refrigerant with the low temperature and low pressure flowing from the 1-1 outlet 112 to the third refrigerant flow path L3 into the gaseous refrigerant with the low temperature and low pressure.

Thereafter, there proceeds a process in which the refrigerant that has passed through the outer condenser 40 returns to the accumulator 80 and the electric compressor 10 by passing through the fourth refrigerant flow path L4, the second main flow path 221 of the second three-way expansion valve 200, the eighth refrigerant flow path L8, and the refrigerant return flow path L11 in serial order.

As above, the processes for the heat pump mode proceed sequentially and repeatedly, whereby indoor heating may be easily accomplished.

Heat Pump Dehumidification Mode

Figure 6:
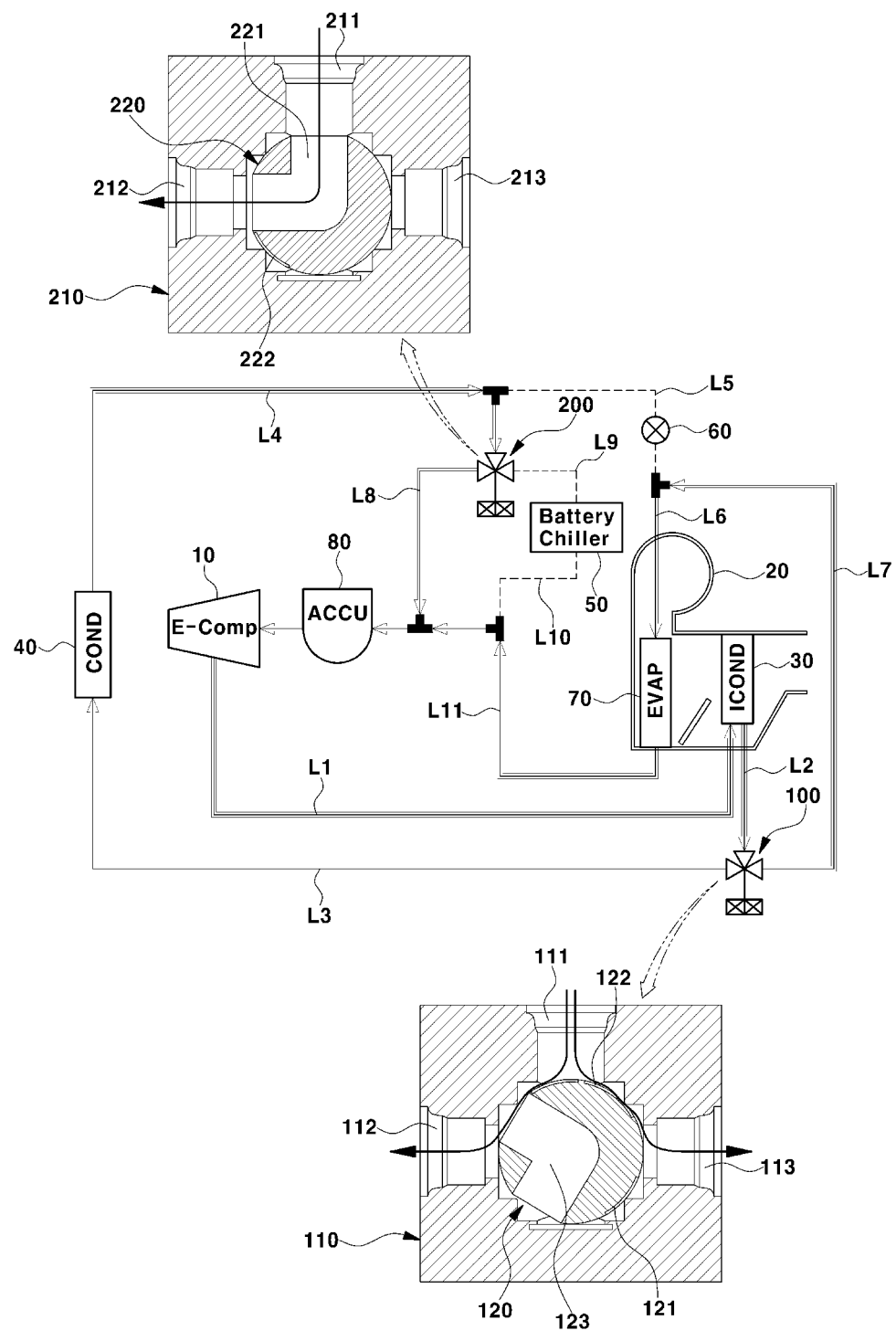
FIG. 6 is a refrigerant circuit diagram showing a heat pump dehumidification mode of the slim-type heat management system for an electric vehicle according to the present disclosure.

Accompanying FIG. 6 is a refrigerant circuit diagram showing a heat pump dehumidification mode of the slim-type heat management system for an electric vehicle according to the present disclosure.

The heat pump dehumidification mode is a mode for removing moisture formed on the windshield glass and the like, that is, a mode for defogging and may be implemented in a state in which, the first three-way expansion valve is controlled to allow the refrigerant to flow from the second refrigerant flow path to the third refrigerant flow path and the seventh refrigerant flow path to flow to be expandable at the same time, the second three-way expansion valve is controlled to be fully open to allow communication of the fourth refrigerant flow path, and the eighth refrigerant flow path, and the expansion valve is controlled to be closed.

In more detail, as shown in FIG. 6, for the heat pump dehumidification mode, the first valve rotating member 120 of the first three-way expansion valve 100 is controlled to allow the refrigerant to flow from the first inlet 111 connected to the second refrigerant flow path L2 to the 1-1 outlet 112 connected to the third refrigerant flow path L3 by passing through the 1-1 expansion flow path 121, and is controlled, at the same time, to allow the refrigerant to flow from the first inlet 111 connected to the second refrigerant flow path L2 to the 1-2 outlet 113 connected to the seventh refrigerant flow path L7 by passing through the 1-2 expansion flow path 122, the second valve rotating member 220 of the second three-way expansion valve 200 is controlled to be in a fully open state to accomplish communication between the second inlet 211 connected to the fourth refrigerant flow path L4 and the 2-1 outlet 212 connected to the eighth refrigerant flow path L8 by the second main flow path 221, and the expansion valve 60 is controlled to be closed not to allow the refrigerant to flow from the fifth refrigerant flow path L5 to the sixth refrigerant flow path L6.

Subsequently, there proceeds a process in which the gaseous refrigerant with the high temperature and high pressure having been discharged into the first refrigerant flow path L1 by the driving of the electric compressor 10 flows into the inner condenser 30.

Accordingly, there proceeds a process in which the refrigerant entering the inner condenser 30 is converted into the liquid refrigerant with the high temperature and high pressure by the condensation action of the inner condenser 30, thereby being subjected to the heat dissipation.

At this time, when the refrigerant in the inner condenser 30 is converted into the liquid refrigerant with the high temperature and high pressure, thereby being subjected to the heat dissipation, the external air passing through the periphery of the inner condenser 30 is heated and faces the inside of the room, whereby indoor heating may be accomplished.

Subsequently, there proceeds a process in which the refrigerant flowing along the second refrigerant flow path L2 from the inner condenser 30 is converted into the liquid refrigerant with the low temperature and low pressure while passing through the first three-way expansion valve 100, thereby flowing into the third refrigerant flow path L3 and the seventh refrigerant flow path L7.

In other words, there may proceed a process in which, the refrigerant flowing along the second refrigerant flow path L2 from the inner condenser 30 in the liquid state having the low temperature and low pressure, after entering the first inlet 111 of the first three-way expansion valve 100, passes from the first inlet 111 through the 1-1 expansion flow path 121, which is narrow like an orifice path of the first valve rotating member 120, and expands while flowing to the 1-1 outlet 112, thereby being converted into the liquid refrigerant with the low temperature and the low pressure.

At the same time with this, there may proceed a process in which, the liquid refrigerant with the high temperature and the high pressure flowing along the second refrigerant flow path L2 from the inner condenser 30, after entering the first inlet 111 of the first three-way expansion valve 100, passes from the first inlet 111 through the 1-2 expansion flow path 122, which is narrow like an orifice path of the second valve rotating member 220, and expands while flowing to the 1-2 outlet 113, thereby being converted into the liquid refrigerant with the low temperature and low pressure.

Next, there proceeds a process in which the liquid refrigerant with the low pressure flowing from the 1-1 outlet 112 to the third refrigerant flow path L3 is converted into the gaseous refrigerant with the low temperature and low pressure at the outer condenser 40.

At this time, the outer condenser 40 serves as an evaporator to convert the liquid refrigerant with the low temperature and low pressure flowing from the 1-1 outlet 112 to the third refrigerant flow path L3 into gaseous refrigerant with the low temperature and low pressure.

In addition, there proceeds a process in which the liquid refrigerant with the low pressure flowing from the 1-2 outlet 113 to the seventh refrigerant flow path L7 is converted into the gaseous refrigerant with the low temperature and low pressure in the evaporator 70.

In other words, when the liquid refrigerant with the low pressure flowing into the seventh refrigerant flow path L7 is converted into the gaseous refrigerant with the low temperature and low pressure by heat absorption of the evaporator 70, the external air passing through the periphery of the evaporator 70 is cooled and supplied for the dehumidification to the inside of the room, whereby defogging that removes moisture formed on the windshield glass may be accomplished.

Thereafter, there proceed processes in which the refrigerant that has passed through the outer condenser 40 returns to the accumulator 80 and the electric compressor 10 by passing through the fourth refrigerant flow path L4, the second three-way expansion valve 200, the eighth refrigerant flow path L8, and the refrigerant return flow path L11 in serial order, and at the same time, the refrigerant that has passed through the evaporator 70 returns to the accumulator 80 and the electric compressor 10 by passing through the refrigerant return flow path L11.

On the other hand, when there is no heat pump dehumidification mode, the air conditioning mode needs to be executed in order to defog the moisture frequently caught in the windshield glass under the condition of an outdoor temperature of −5° C. to 10° C.

However, after executing the air conditioning mode for defogging, when switching back to the heat pump mode for heating, there exist problems of control delay and inconvenience of heating/cooling mode switching in that valves for refrigerant flow need to be operated after elapsing about 30 seconds in order to bring the refrigerant pressure in the refrigerant flow path to a flat pressure, the electric compressor needs to be operated after the valves are operated, and the like.

In addition, when the air conditioning mode is executed for defogging and then is switched back to the heat pump mode, and provided the electric compressor is not turned off but continues to be maintained in an on state, there follows a problem in that a hitting noise is generated due to cavitation caused by a refrigerant pressure difference.

Therefore, the heat pump dehumidification mode for defogging among the heat pump modes as described above may be separately implemented, and as above, the processes for the heat pump dehumidification mode are sequentially repeated, whereby the defogging during indoor heating may be easily accomplished.

Dehumidification Max Mode

Figure 7:
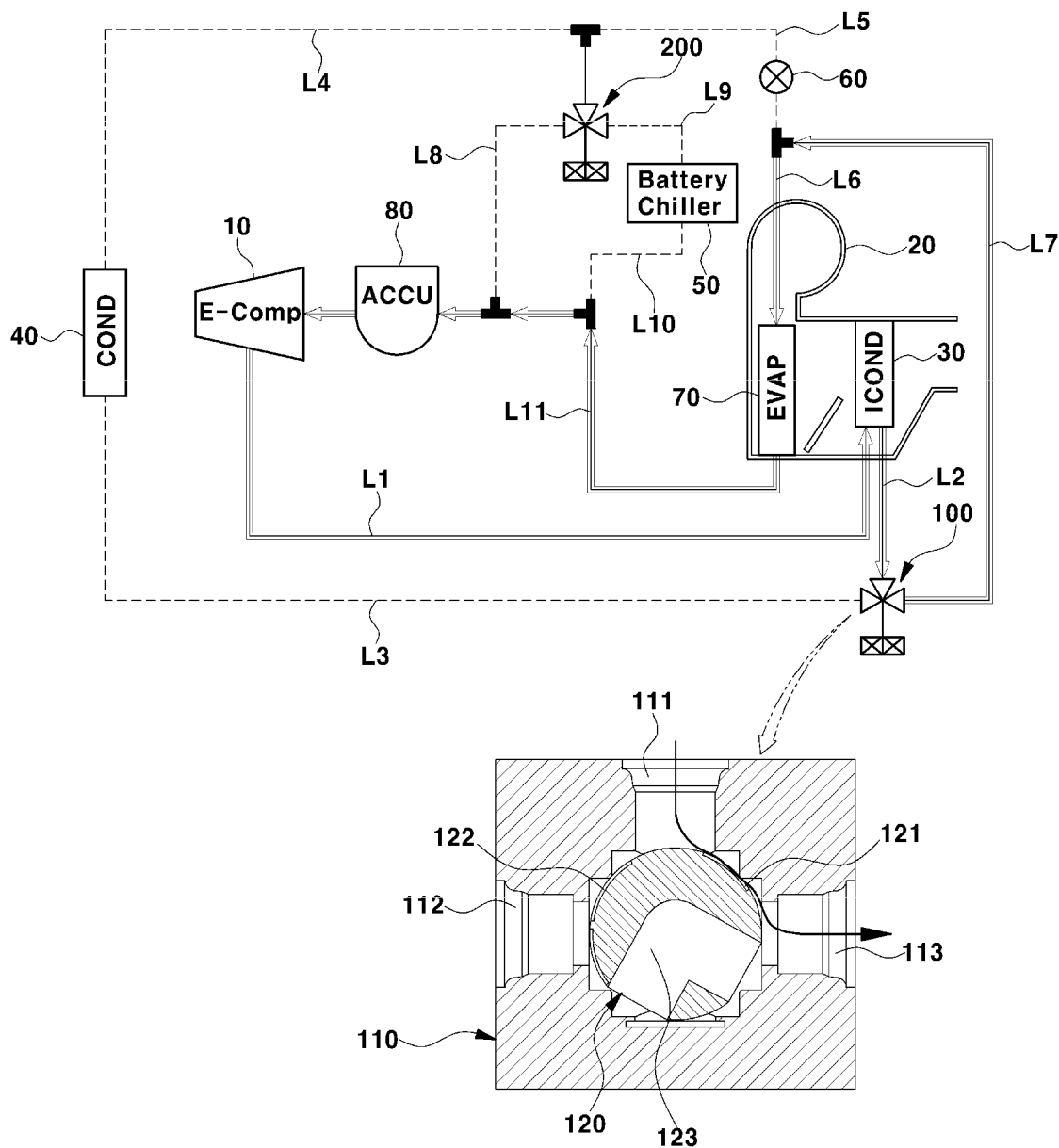
FIG. 7 is a refrigerant circuit diagram showing a dehumidification max mode of the slim-type heat management system for an electric vehicle according to the present disclosure.

Accompanying FIG. 7 is a refrigerant circuit diagram showing a dehumidification max mode of the slim-type heat management system for an electric vehicle according to the present disclosure.

The dehumidification max mode refers to a mode in which moisture formed on the windshield glass may be quickly and intensively removed.

To this end, the dehumidification max mode for strengthening defogging may be implemented in a state in which, the first three-way expansion valve is controlled to block the refrigerant flow between the second refrigerant flow path L2 and the third refrigerant flow path L3 and is controlled, at the same time, to allow the refrigerant to flow to be expandable from the second refrigerant flow path L2 to the seventh refrigerant flow path L7, and the expansion valve 60 is controlled to be closed.

In more detail, as shown in FIG. 7, for the dehumidification max mode for strengthening the defogging, the first valve rotating member 120 of the first three-way expansion valve 100 is controlled to allow the refrigerant to flow from the first inlet 111 connected to the second refrigerant flow path L2 to the 1-2 outlet 113 connected to the seventh refrigerant flow path L7 by passing through the 1-2 expansion flow path 122 and is controlled, at the same time, not to allow the refrigerant to flow from the first inlet 111 connected to the second refrigerant flow path L2 to the 1-1 outlet 112 connected to the third refrigerant flow path L3, and the expansion valve 60 is controlled to be in a closed state not to allow the refrigerant to flow from the fifth refrigerant flow path L5 to the sixth refrigerant flow path L6.

Subsequently, there proceeds a process in which the gaseous refrigerant with the high temperature and high pressure having been discharged into the first refrigerant flow path L1 by the driving of the electric compressor 10 flows into the inner condenser 30.

Accordingly, there proceeds a process in which the refrigerant entering the inner condenser 30 is converted into the liquid refrigerant with the high temperature and high pressure by the condensation action of the inner condenser 30, thereby being subjected to the heat dissipation.

At this time, when the refrigerant in the inner condenser 30 is converted into the liquid refrigerant with the high temperature and high pressure, thereby being subjected to the heat dissipation, the external air passing through the periphery of the inner condenser 30 is heated and faces the inside of the room, whereby indoor heating may be accomplished.

Subsequently, there proceeds a process in which the liquid refrigerant with the low temperature and low pressure flowing along the second refrigerant flow path L2 from the inner condenser 30 is converted into the liquid refrigerant with the low temperature and low pressure while passing through the first three-way expansion valve 100, thereby intensively flowing into the seventh refrigerant flow path L7.

In other words, there may proceed a process in which, the refrigerant flowing along the second refrigerant flow path L2 from the inner condenser 30 in the liquid state having the low temperature and low pressure, after entering the first inlet 111 of the first three-way expansion valve 100, passes from the first inlet 111 through the 1-1 expansion flow path 121, which is narrow like an orifice path of the first valve rotating member 120, and expands while flowing to the 1-1 outlet 112, thereby being converted into the liquid refrigerant with the low temperature and the low pressure.

Subsequently, there proceeds a process in which the liquid refrigerant with the low pressure intensively flowing from the 1-2 outlet 113 only to the seventh refrigerant flow path L7 is converted into the gaseous refrigerant with the low temperature and low pressure at the evaporator 70.

In other words, when the liquid refrigerant with the low pressure flowing into the seventh refrigerant flow path L7 is converted to the gaseous refrigerant with the low temperature and low pressure by heat absorption of the evaporator 70, the external air passing through the periphery of the evaporator 70 is cooled and supplied for the dehumidification to the inside of the room, whereby defogging that removes moisture formed on the windshield glass may be accomplished.

Thereafter, there proceed processes in which the refrigerant that has passed through the evaporator 70 passes through the refrigerant return flow path L11, thereby returning to the accumulator 80 and the electric compressor 10.

On the other hand, when the system is switched into the air conditioning mode during the heat pump mode in order to quickly remove the moisture formed on the windshield glass and the like, provided the electric compressor is not turned off temporarily (about 30 seconds), there is a problem such as a "popping" sound generated and the like due to the refrigerant pressure difference. In addition, there is a problem in that, in switching into the heat pump mode back from the air conditioning mode, a time delay phenomenon occurs such that the operation of the electric compressor needs to be operated after a predetermined delay time (about 30 seconds) passed to bring the refrigerant pressure to be equal to the flat pressure and so on.

In order to solve such a problem, when the dehumidification max mode is used without switching into the air conditioning mode during the heat pump modes, there is no need to use the air conditioning mode to quickly and intensively remove moisture formed on the windshield glass and the like. Accordingly, it is possible to eliminate the time delay of temporarily turning off the electric compressor in order to switch to the air conditioning mode for defogging. As a result, the moisture formed on the windshield glass may be quickly, intensively, and easily removed.

Although the present disclosure has been described in detail with various embodiments above, the scope of a right of the present disclosure is not limited to each of the above-described embodiments, and various modifications and improvements by those skilled in the art using the basic concept of the present disclosure as defined in the claims below will also be included in the scope of the right of the present disclosure.

What is claimed is:

1. A heat management system for an electric vehicle, the system comprising:
an inner condenser mounted inside an air conditioner casing and connected to a discharge portion of an electric compressor by a first refrigerant flow path;
a first three-way expansion valve connected to the inner condenser by a second refrigerant flow path;
an outer condenser connected to a 1-1 outlet of the first three-way expansion valve by a third refrigerant flow path;
a second three-way expansion valve connected to the outer condenser by a fourth refrigerant flow path;

an expansion valve connected to a fifth refrigerant flow path branched off from the fourth refrigerant flow path;
an evaporator mounted inside the air conditioner casing and connected to the expansion valve by a sixth refrigerant flow path;
a seventh refrigerant flow path connected between a 1-2 outlet of the first three-way expansion valve and the sixth refrigerant flow path;
an accumulator connected to the evaporator by a refrigerant return flow path and connected to an inlet portion of the electric compressor;
an eighth refrigerant flow path connected between a 2-1 outlet of the second three-way expansion valve and the refrigerant return flow path;
a battery chiller connected to a 2-2 outlet of the second three-way expansion valve by a ninth refrigerant flow path; and
a tenth refrigerant flow path connected between the battery chiller and the refrigerant return flow path.

2. The system of claim 1, wherein the outer condenser is adapted to perform a condenser function in an air conditioning mode and to serve as an evaporator in a heat pump mode.

3. The system of claim 1, wherein the first three-way expansion valve comprises:
a first valve body having a first inlet connected to the second refrigerant flow path, the 1-1 outlet connected to the third refrigerant flow path, and the 1-2 outlet connected to the seventh refrigerant flow path; and
a first valve rotating member having a first main flow path provided in a form being bent at a right angle therein, a 1-1 expansion flow path provided at a first section of a circular arc thereof for allowing communication between the first inlet and the 1-1 outlet, and a 1-2 expansion flow path provided at a section of a circular arc thereof for allowing communication between the first inlet and the 1-2 outlet.

4. The system of claim 3, wherein the 1-1 expansion flow path is provided as concave at a first section of the circular arc of the first valve rotating member, which is spaced apart from the first main flow path, and
the 1-2 expansion flow path is provided as concave at a second section of the circular arc of the first valve rotating member, which is spaced apart from the first main flow path.

5. The system of claim 1, wherein the second three-way expansion valve comprises:
a second valve body having a second inlet connected to the fourth refrigerant flow path, the 2-1 outlet connected to the eighth refrigerant flow path, and the 2-2 outlet connected to the ninth refrigerant flow path; and
a second valve rotating member having a second main flow path provided in a form being bent at a right angle therein and a second expansion flow path provided at a partial circular arc section of an outer diameter surface for allowing communication to be accomplished between the second inlet and the 2-2 outlet.

6. The system of claim 5, wherein the second expansion flow path is provided to be concave at a partial circular arc section on one side, deviated out of the second main flow path, of an outer diameter surface of the second valve rotating member.

7. The system of claim 1, wherein an air conditioning mode for indoor cooling is implemented in a state in which the first three-way expansion valve is controlled to be fully open so as to accomplish communication between the second refrigerant flow path and the third refrigerant flow path, the second three-way expansion valve is controlled to be closed so as to block refrigerant flow, and the expansion valve is controlled to be opened.

8. The system of claim 7, wherein, in the air conditioning mode, there sequentially and repeatedly proceed processes including a process in which a gaseous refrigerant with high temperature and high pressure having been discharged into the first refrigerant flow path by driving of the electric compressor is firstly subjected to heat dissipation in the inner condenser, a process in which the refrigerant flowing to the third refrigerant flow path by passing through the second refrigerant flow path and the first three-way expansion valve is converted into a liquid refrigerant with the high temperature and high pressure by secondary heat dissipation of the outer condenser, a process in which the refrigerant flowing along the fourth refrigerant flow path and the fifth refrigerant flow path is converted into the liquid refrigerant with low temperature and low pressure in the expansion valve, a process in which the refrigerant flowing along the sixth refrigerant flow path is converted into the gaseous refrigerant with the low temperature and low pressure in the evaporator, and a process in which the refrigerant that has passed through the evaporator returns to the accumulator and the electric compressor through the refrigerant return flow path.

9. The system of claim 1, wherein a battery cooling mode is implemented in a state in which the first three-way expansion valve is controlled to be fully open so as to accomplish communication between the second refrigerant flow path and the third refrigerant flow path, the second three-way expansion valve is controlled to be closed so as to block refrigerant flow between the fourth refrigerant flow path and the eighth refrigerant flow path and is controlled, at the same time, to allow the refrigerant to flow to be expandable from the fourth refrigerant flow path to the ninth refrigerant flow path, and the expansion valve is controlled to be closed.

10. The system of claim 9, wherein, in the battery cooling mode, there sequentially and repeatedly proceed processes including a process in which a gaseous refrigerant with high temperature and high pressure having been discharged into the first refrigerant flow path by driving of the electric compressor is firstly subjected to heat dissipation in the inner condenser, a process in which the refrigerant flowing to the third refrigerant flow path by passing through the second refrigerant flow path and the first three-way expansion valve is converted into a liquid refrigerant with the high temperature and high pressure by secondary heat dissipation of the outer condenser, a process in which the refrigerant flowing along the fourth refrigerant flow path is expanded while passing through the second three-way expansion valve and is converted into the liquid refrigerant with low temperature and low pressure, a process in which the refrigerant flowing along the ninth refrigerant flow path cools a battery while being converted into the gaseous refrigerant with the low temperature and low pressure in the battery chiller, and a process in which the refrigerant that has passed through the battery chiller returns to the accumulator and the electric compressor through the tenth refrigerant flow path and the refrigerant return flow path.

11. The system of claim 1, wherein an air conditioning mode and a battery cooling mode are simultaneously implemented in a state in which the first three-way expansion valve is controlled to be fully open so as to accomplish communication between the second refrigerant flow path and the third refrigerant flow path, the second three-way expansion valve is controlled so as to block refrigerant flow between the fourth refrigerant flow path and the eighth refrigerant flow path and, at the same time, is controlled to allow the refrigerant to flow to be expandable from the fourth refrigerant flow path to the ninth refrigerant flow path, and the expansion valve is controlled to be opened.

12. The system of claim 11, wherein, in the air conditioning mode and the battery cooling mode, there sequentially and repeatedly proceed processes including a process in which a gaseous refrigerant with high temperature and high pressure having been discharged into the first refrigerant flow path by driving of the electric compressor is firstly subjected to heat dissipation in the inner condenser, a process in which the refrigerant flowing to the third refrigerant flow path by passing through the second refrigerant flow path and the first three-way expansion valve is converted into a liquid refrigerant with the high temperature and high pressure by secondary heat dissipation of the outer condenser, a process in which the refrigerant flowing along the fourth refrigerant flow path is expanded while passing through the second three-way expansion valve and is converted into the liquid refrigerant with low temperature and low pressure, a process in which the refrigerant flowing along the ninth refrigerant flow path cools a battery while being converted into the gaseous refrigerant with the low temperature and low pressure in the battery chiller, a process in which the refrigerant flowing along the fourth refrigerant flow path and the fifth refrigerant flow path is converted into the liquid refrigerant with the low temperature and low pressure in the expansion valve, a process in which the refrigerant flowing along the sixth refrigerant flow path is converted into the gaseous refrigerant with the low temperature and low pressure in the evaporator, and a process in which the refrigerant that has passed through the battery chiller returns to the accumulator and the electric compressor by passing through the tenth refrigerant flow path and the refrigerant return flow path, and at the same time, the refrigerant that has passed through the evaporator returns to the accumulator and the electric compressor by passing through the refrigerant return flow path.

13. The system of claim 1, wherein a heat pump mode is implemented in a state in which the first three-way expansion valve is controlled so as to block refrigerant flow between the second refrigerant flow path and the seventh refrigerant flow path and is controlled, at the same time, is controlled to allow the refrigerant to flow to be expandable from the second refrigerant flow path to the third refrigerant flow path, the second three-way expansion valve is controlled to be fully open so as to accomplish communication between the fourth refrigerant flow path and the eighth refrigerant flow path, and the expansion valve is controlled to be closed.

14. The system of claim 13, wherein, in the heat pump mode, there sequentially and repeatedly proceed processes including a process in which, when a gaseous refrigerant with high temperature and high pressure having been discharged into the first refrigerant flow path by driving of the electric compressor is subjected to heat dissipation while being converted into a liquid refrigerant with the high temperature and high pressure in the inner condenser, external air passing through periphery of the inner condenser is heated and faces the inside of a room, a process in which the refrigerant flowing along the second refrigerant flow path from the inner condenser is converted into the liquid refrigerant with low temperature and low pressure while passing through the first three-way expansion valve, thereby flowing into the third refrigerant flow path, a process in which the refrigerant flowing into the third refrigerant flow path is converted into the gaseous refrigerant with the low temperature and low pressure in the outer condenser, and a process in which the refrigerant that has passed through the outer condenser returns to the accumulator and the electric compressor by passing through the fourth refrigerant flow path, the second three-way expansion valve, the eighth refrigerant flow path, and the refrigerant return flow path in order.

15. The system of claim 1, wherein a heat pump dehumidification mode for defogging is implemented in a state in which the first three-way expansion valve is controlled to allow the refrigerant to flow from the second refrigerant flow path to the third refrigerant flow path and the seventh refrigerant flow path to flow to be expandable at the same time, the second three-way expansion valve is controlled to be fully open to accomplish communication of the fourth refrigerant flow path and the eighth refrigerant flow path, and the expansion valve is controlled to be closed.

16. The system of claim 15, wherein, in the heat pump dehumidification mode, there sequentially and repeatedly proceed processes including a process in which, when a gaseous refrigerant with high temperature and high pressure having been discharged into the first refrigerant flow path by driving of the electric compressor is subjected to heat dissipation while being converted into a liquid refrigerant with the high temperature and high pressure in the inner condenser, external air passing through periphery of the inner condenser is heated and faces the inside of a room, a process in which the refrigerant flowing along the second refrigerant flow path from the inner condenser is converted into the liquid refrigerant with low temperature and low pressure while passing through the first three-way expansion valve, thereby flowing into the third refrigerant flow path and the seventh refrigerant flow path, a process in which the refrigerant flowing into the third refrigerant flow path is converted into the gaseous refrigerant with the low temperature and low pressure in the outer condenser, a process in which, when the refrigerant flowing into the seventh refrigerant flow path is converted into the gaseous refrigerant with the low temperature and low pressure due to heat absorption of the evaporator, the external air passing through the evaporator is cooled and supplied for dehumidification to the inside of a room, and a process in which the refrigerant that has passed through the outer condenser returns to the accumulator and the electric compressor by passing through the fourth refrigerant flow path, the second three-way expansion valve, the eighth refrigerant flow path, and the refrigerant return flow path in order, and at the same time, the refrigerant that has passed through the evaporator returns to the accumulator and the electric compressor by passing through the refrigerant return flow path in order.

17. The system of claim 1, wherein a dehumidification max mode for strengthening defogging is implemented in a state in which the first three-way expansion valve is controlled so as to block refrigerant flow between the second refrigerant flow path and the third refrigerant flow path and is controlled, at the same time, to allow the refrigerant to flow to be expandable from the second refrigerant flow path to the seventh refrigerant flow path, and the expansion valve is controlled to be closed.

18. The system of claim 17, wherein, in the dehumidification max mode, there sequentially and repeatedly proceed processes including a process in which a gaseous refrigerant with high temperature and high pressure having been discharged into the first refrigerant flow path by driving of the electric compressor is converted into a liquid refrigerant with the high temperature and high pressure in the inner condenser, a process in which the refrigerant flowing along the second refrigerant flow path from the inner condenser is converted into the liquid refrigerant with low temperature and low pressure while passing through the first three-way expansion valve, thereby intensively flowing only into the seventh refrigerant flow path, a process in which, when the refrigerant flowing into the seventh refrigerant flow path is converted into a low-temperature and low-pressure gaseous refrigerant by heat absorption of the evaporator, external air passing through periphery of the evaporator is cooled and supplied for dehumidification to the inside of a room, and a process in which, the refrigerant that has passed through the evaporator returns to the accumulator and the electric compressor by passing through the refrigerant return flow path in order.

\* \* \* \* \*